United States Patent [19]

Ontiveros

[11] Patent Number: 5,148,773

[45] Date of Patent: Sep. 22, 1992

[54] FORCED AIR INCUBATOR

[76] Inventor: Fabio J. T. Ontiveros, Juarez No. 125, Tlaquepaque, Jalisco, Mexico

[21] Appl. No.: 699,304

[22] Filed: Apr. 17, 1991

[51] Int. Cl.$^5$ ............................................. A01K 41/00
[52] U.S. Cl. ..................................................... 119/37
[58] Field of Search ........................ 119/35, 37, 39, 44

[56] References Cited

U.S. PATENT DOCUMENTS

| | | | |
|---|---|---|---|
| 2,764,959 | 10/1956 | Church | 119/37 |
| 3,543,726 | 12/1970 | Marsh | 119/37 |
| 3,783,832 | 1/1974 | Marsh | 119/37 |
| 3,817,214 | 6/1974 | Bardet | 119/37 |
| 4,501,228 | 2/1985 | Hinds | 119/37 |

FOREIGN PATENT DOCUMENTS 2207334  2/1989  United Kingdom ................ 119/37

Primary Examiner—Gene Mancene
Assistant Examiner—Thomas Price
Attorney, Agent, or Firm—Ladas & Parry

[57] ABSTRACT

This invention relates to a transparent incubator which makes possible the observation the hatching process of eggs. This incubator functions automatically or semi-automatically as regards the turning or rotation of the eggs, whether activated by a slight rotary movement of the cap of the dome or whether a conventional electrical turner is used. The heat required for the incubation process is supplied by an electrical resistor and is controlled by a conventional solid state thermostat. Humidity is supplied by small compartments that are located in the base of the incubator. The humidity will be greater or lesser depending on the number of compartments which are occupied by water.

7 Claims, 4 Drawing Sheets

FORCED AIR INCUBATOR

BACKGROUND OF THE INVENTION

To date we know of several embodiments of incubators such as the one disclosed in U.S. Pat. No. 3,543,726 which relates to an egg incubator having a generally circular horizontal vented support platform at a position slightly above a base, and a plurality of spokes disposed in a circular ring with said spokes radiating from the center of the platform. Said incubator is provided with a circular cover which is removably disposed on the base for rotational movement relative to the base, and with means for transmitting rotary motion of the cover to said ring of spokes and thence to eggs disposed on the platform between said spokes in order to turn the egs without opening the cover.

U.S. Pat. No. 3,699,075 discloses an automatic egg turner for incubator having a drive motor which drives an output shaft having a cam thereon, and a crank arm provided on said output shaft, which is connected to the egg grid of an incubator to move said grid from one position to another each time the output shaft is rotated 180°.

U.S. Pat. No. 3,783,832 is related to an automatic egg incubator in which a rack supports the eggs in a row with a movable grid above the rack extending between the eggs. The grid is moved periodically by a motor to turn the eggs. A transparent dome-like cover extending over the eggs supports a fan and a heater, while a plate supported by the cover directs the air downwardly around the periphery of the rack and upwardly towards the centrally supported fan. This incubator also includes a humidifier water supply fountain.

The embodiments above discussed are apparently similar to the incubator object of the present invention, but they present serious deficiences in the egg turning system, in the control of the heat and in the control of the circulation of the air that carries the oxygen and other gases which are necessary for the correct incubation and hatching of the eggs.

In incubators of this type the system used for rotating the eggs, as the ones disclosed in U.S. Pat. Nos. 3,543,726; 3,669,075 and 3,783,832 are deficient since usually the eggs are dragged over a wire mesh by activating a plastic ring that supports a radial wire strip and that drags the eggs along with it when it turns. With this turning system the egg is sometimes dragged along without being turned or rotated and the corresponding segment also sometimes tends to remain crosswise. In incubators of this type, cleaning and sanitation is impossible because there are intercommunicated spaces to which there is no access for cleaning.

The incubators known to date use a resistance light bulb or a resistor as a heat source, which is mounted on a plastic baffle plate, and the thermostat is placed on this baffle at the same level of the heat source. The result of this arrangement is that the thermostat is very close to and practically in direct contact with the incandescent thermic resistance, which makes the thermostat to actuate deficiently and with a greater risk of damage. Moreover, the location of the thermostat keeps same distanced from the precise place where the optimal temperature must be regulated for an optimal incubation process.

The most important of all these problems concerns the air circulation, since the known incubators do not control neither the admission or the exit of air, and thus it is impossible to regulate the humidity and the balance of gases required for a good incubation.

The characteristic details of the incubator of this invention which solve all the above mentioned problems is clearly shown in the following description and in the drawings which will serve as an illustration, in which the same reference signs are used to indicate the same parts in the figures, in which.

DETAILED DESCRIPTION OF THE INVENTION

Figure 1:
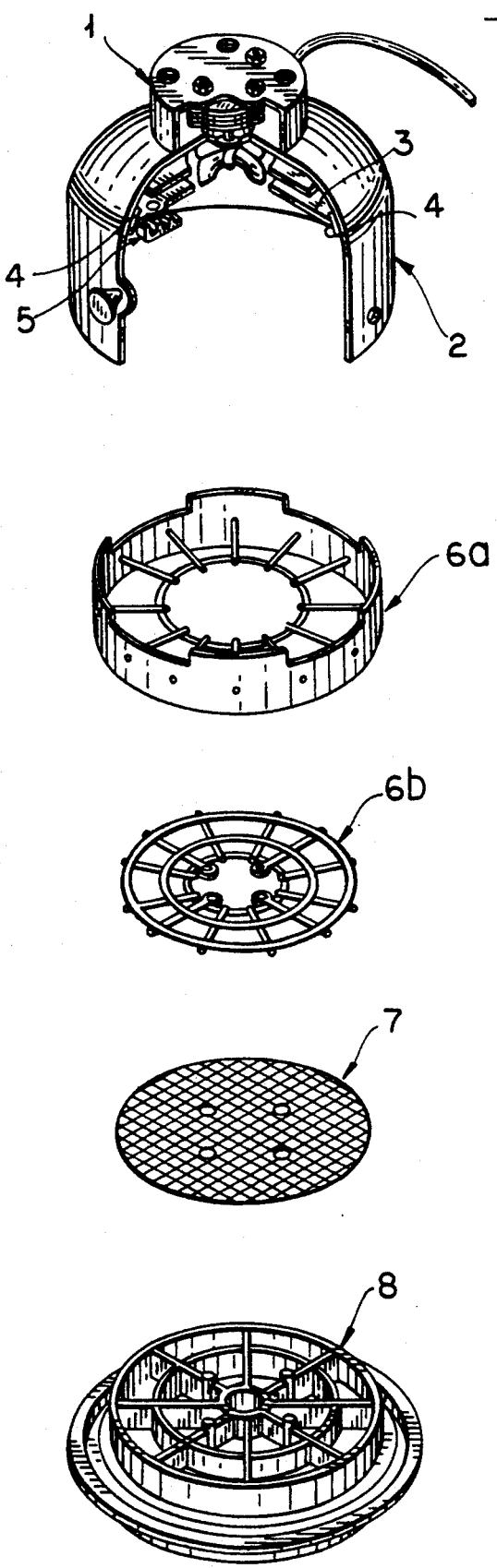
FIG. 1, is a conventional perspective view of the incubator which is the object of this invention.
Figure 1A:
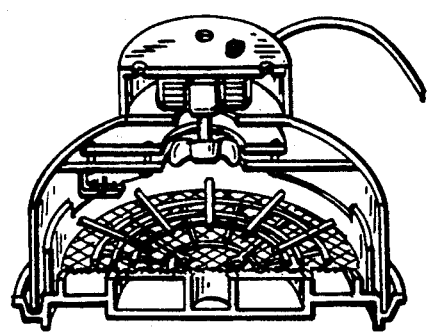

Refering to the figures above mentioned, as can be seen in FIG. 1, the incubator consists of a plastic cover (1) that covers a small motor that moves the propeller of a fan (b), a transparent plastic dome (2), that forms the box of the incubator, a baffle plate separator (3), for supporting a resistor and for keeping the incubation chamber separated, being aided for this purposes by a packing (4) that will be fastened between this separator (3) and the dome; a thermostat (5) installed outside of the heating chamber, a turner (6) constituted by two parts, (6a), and (6b); a false wire mesh base (7) on which the egg turner (6) rests, and a base (8) which contains a plurality of water compartments that provide humidity.

Figure 2:
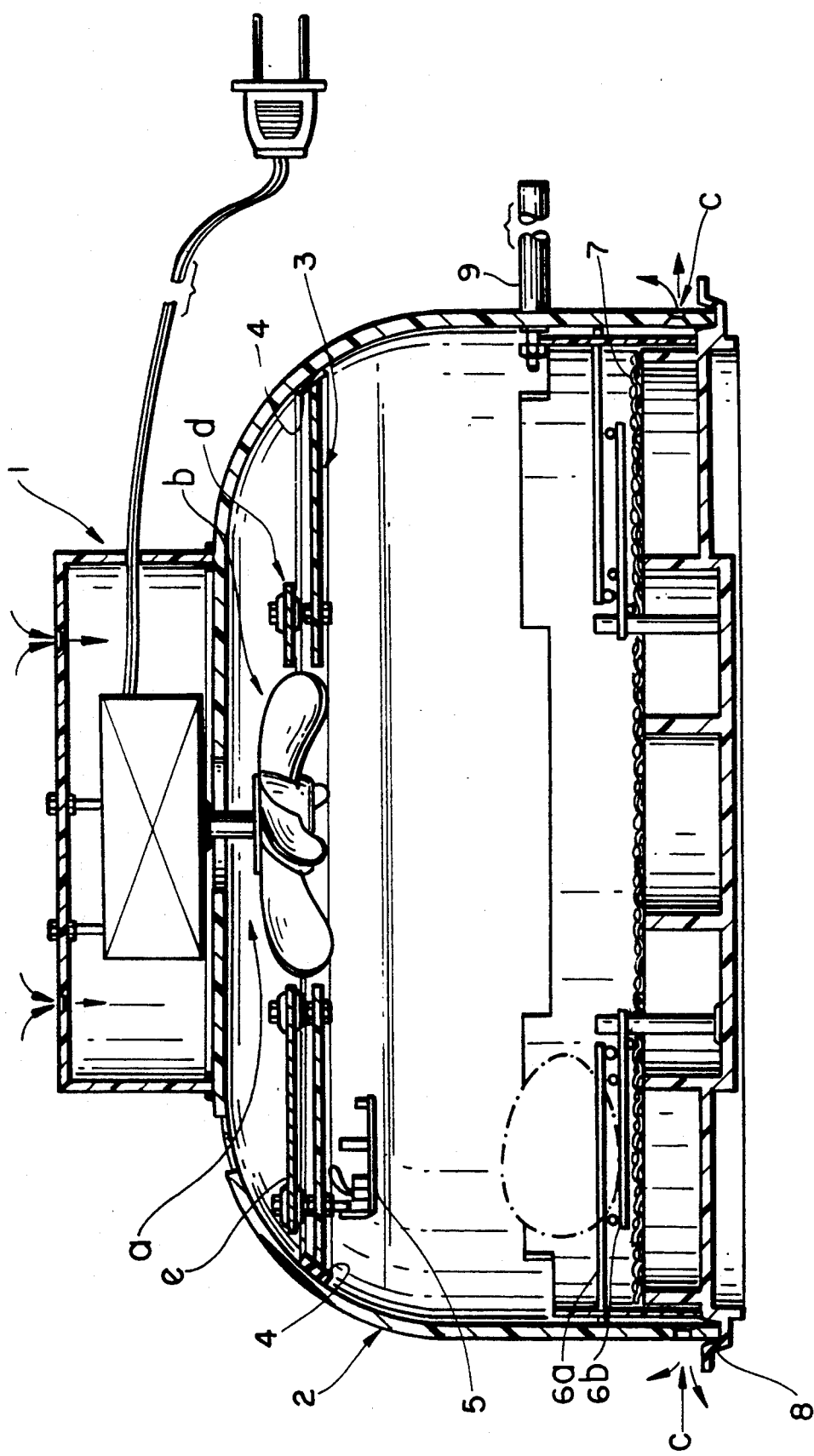
FIG. 2, is a transverse section view of the incubator of the invention.

As can be seen in FIG. 2, the plastic cover (1) that covers the fan motor which is circular in shape and with an approximate diameter of 5" and a height of 1½" rests on the upper part of the dome (2), being joined to it by means of an intermediate packing. On the upper part, the cover has four small orifices for the controlled admission of air. The transparent plastic dome has a circular base with a diameter of 12" and a height of 6". In the top part of the dome there is a central upper orifice (a) where the blades of the fan (b) are mounted. Four orifices (c) are placed laterally on the lower part of the dome to regulate the exit of the air admitted by the orifices of the plastic cover of the fan motor. The base of the of the dome rests on a plastic base (8), which has a circular groove intended for this purpose. The groove must be lubricated so that it seals hermetically and does not allow escape either of humidity or of air, thus being able to have control over the regulation of both. A plastic separator (3) of about 8½" in diameter with a central hole with a diameter of about 3", through which the blades of the fan (b) will project the briefly heated air into the upper chamber. The separator lodges a series of ceramic insulators (d), where an electrothermic resistor (e) is installed. A circular packing (4) that keeps the edge of the separator joined to the upper part of the dome (2), maintaining two independent chambers. The upper chamber lodges the thermal element and the lower chamber accomodates the eggs that are being incubated. A solid state thermostat (5) installed inside the incubation chamber, from which only the electrical poles cross to the heating chamber, controlling the resistor circuit. The two parts of the egg turner are: a plastic ring (6a) of approximately 2½" high, on which rest twelve equidistant radial wires which form three concentric rings of wire (6b) separated from each other in a conventional manner, depending on the size of the eggs of the species of fowl which are to be incubated. These concentric rings are joined by twelve equidistant radial wires that act as a slight stop in order to obligate the eggs to turn or rotate on or about their axis. When pushed by the radial wires of plastic ring (6a), the egg will be placed between two of the concentric wires, with the vertex thereof oriented toward the center of the incubator. The preferred separation between wires for hen eggs is of 1½", and the diameters of the rings is of about 6" and 7½" respectively. The egg will rotate on these wire rings due to a slight rotary movement of the plastic ring (6a) of the turner, which is actuated from outside the dome by means of a small sleeve (9) that passes through the lateral wall of the plastic dome (2), that drags the eggs with it on the turning base (6b). This movement is so simple that it can be done in a semi-automatic manner when the movement is manual and completely automatic when a conventional electrical turner is used.

The false wire mesh (7) is circular in shape and has an approximate diameter of 10". The mesh is affixed to the base (8), that contains the plurality of water compartments. The false wire mesh floor will serve as a resting place for the newly hatched birds and also to prevent them to fall into the water compartments that provide the required humidity. The base (8) which is approximately 12½" in diameter is divided in several intercommunicating compartments by means of grooves that reach different heights of the walls, so that the filling of one or several of these compartments can be regulated just by raising or lowering the water level in a single compartment, using the principle of the law of communicating glasses. An inverted bottle filled with water, whose exit is regulated by modifying its height serves to supply the water deposits of the base.

Figure 3:
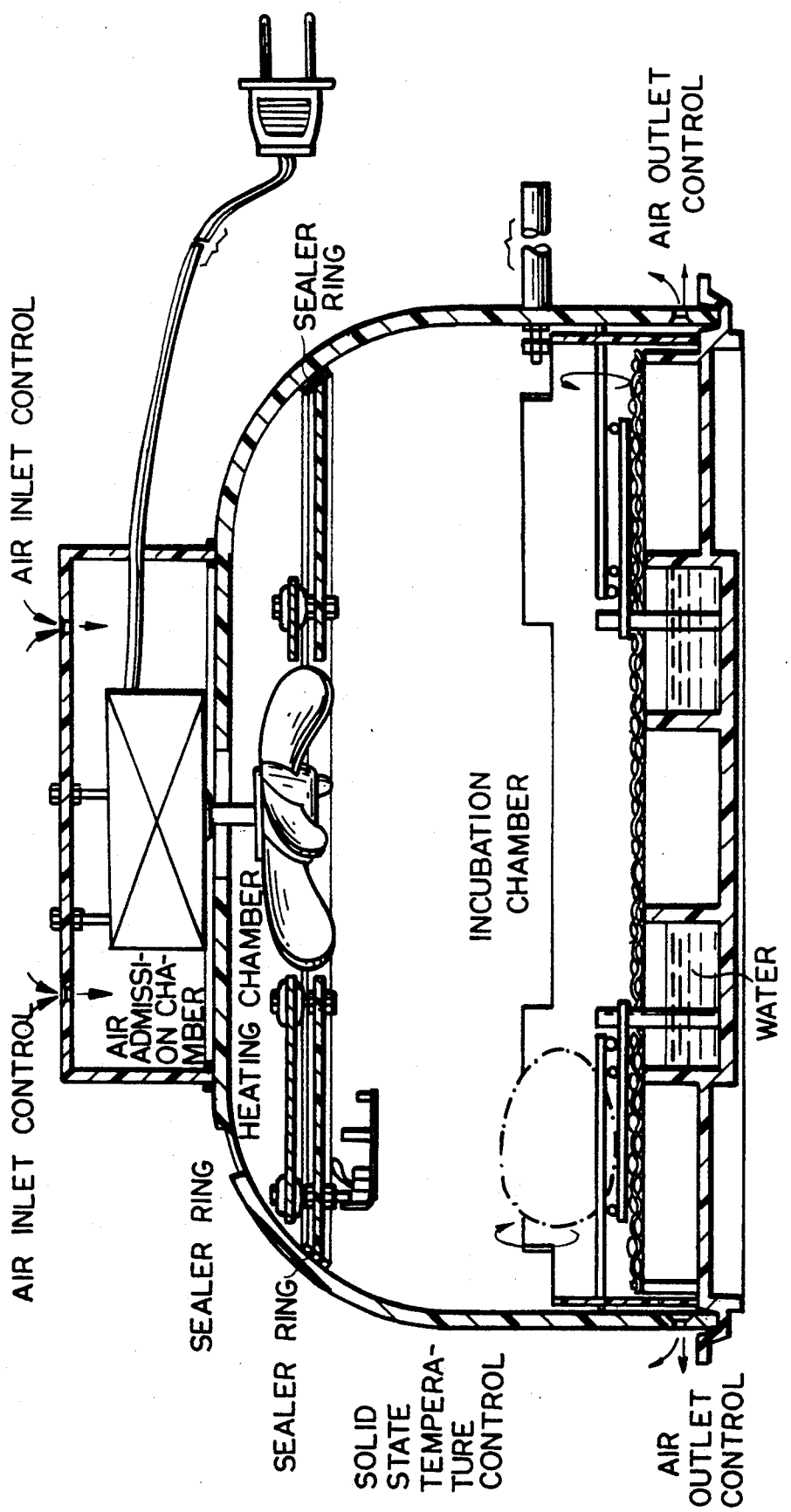
FIG. 3, shows the technical and operative differences that are considered as advantageous improvements over the incubators of the prior art.

As can be appreciated in FIG. 3, the tecnical and operative differences between the incubator model of the invention and those already known are:
1) Absolute control of air admission.
2) Air admission chamber which at the same time accomodates the motor that drives the air circulation.
3) Air heating chamber separated from the incubation chamber.
4) Incubation chamber separated from the heating chamber.
5) Temperature control placed inside the incubation chamber for regulating and activating the thermal element located at a distance inside the heating chamber.
6) Novel, efficient egg turner as described in relation with FIG. 2 (6a and 6b).
7) Easy access for cleaning and sanitary disinfection.

As will be evident to those skilled in the art, various modifications of this invention can be made or followed in the light of the foregoing disclosure and discussion without departing from the spirit and scope of the disclosure or from the scope of the claims.

I claim:

1. An incubator comprising:
   a housing having a transparent dome upper portion for maintaining predetermined internal temperature and humidity conditions in the incubator and a base containing a plurality of interconnected water compartments, the number of compartments containing water being increased by raising a water level in the base;
   a separator for separating said dome into a heating chamber portion and an incubation chamber portion, said heating chamber having a heat source and air circulation means, said incubation chamber receiving and enclosing eggs to be incubated;
   a thermostat located in said incubation chamber and connected to said heat source for controlling the temperature in said incubation chamber;
   egg turner means located in the base, said egg turner means including a ring supporting a plurality of radial wires rotatable about a vertical axis, an egg track formed by a plurality of circular tracks each formed of a ring concentric with said axis, means for rotating said supporting ring from an activation means outside said incubator and a plurality of radial stops attached across said egg track in a path of movement of eggs, whereby movement of eggs by said ring supported radial wires causes said eggs to rotate about said stops.

2. The incubator according to claim 1 wherein said dome has an air inlet therein to allow outside air into said heating chamber to be heated and an air outlet in said incubator chamber portion to allow air to exit said incubator.

3. The incubator according to claim 2 wherein said air circulation means comprises a fan mounted approximately at a center of said heating chamber and said separator has a hole therein to allow heated air into said incubator chamber.

4. The incubator according to claim 1 wherein said thermostat is a solid-state thermostat.

5. The incubator according to claim 1 wherein said egg turner is activated by rotation of said dome.

6. The incubator according to claim 1 wherein said separator is sealed inside said dome and said dome makes a sealing contact with said base.

7. The incubator according to claim 3 wherein said separator is sealed inside said dome and said dome makes a sealing contact with said base.

* * * * *